US004001636B2

United States Statutory Invention Registration [19]

[11] Reg. Number: H1636

Sevenants et al.

[45] Published: Mar. 4, 1997

[54] FLAVOR ENHANCEMENT OF REDUCED FAT NUT BUTTERS THROUGH THE ADDITION OF CITRIC ACID

[76] Inventors: Michael R. Sevenants; John M. Hart, both of The Procter & Gamble Company, Winton Hill Technical Center, 6071 Center Hill Ave., Cincinnati, Ohio 45224-1703

[21] Appl. No.: 561,221

[22] Filed: Nov. 21, 1995

Related U.S. Application Data

[63] Continuation of Ser. No. 361,339, Dec. 21, 1994, abandoned.

[51] Int. Cl.[6] ..... A23L 1/38

[52] U.S. Cl. ..... 426/633

[58] Field of Search ..... 426/633, 626

[56] References Cited

U.S. PATENT DOCUMENTS

| | | | |
|---|---|---|---|
| 2,485,636 | 10/1949 | Neal et al. | 426/633 |
| 3,317,325 | 5/1967 | Durst | 99/126 |
| 3,619,207 | 11/1971 | Dzurik et al. | 99/128 |
| 4,000,322 | 12/1976 | Billerbeck et al. | 426/72 |
| 4,004,037 | 1/1977 | Connick | 426/324 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |
| 5,240,734 | 8/1993 | Izzu et al. | 426/633 |

OTHER PUBLICATIONS

Hawley, G. 1981, The Condensed Chemical Dictionary, 10th Ed., Van Nostrand Reinhold Co., N.Y. pp. 254,255,915.

*Primary Examiner*—Charles T. Jordan
*Assistant Examiner*—Meena Chelliah

[57] ABSTRACT

Disclosed is a reduced fat peanut butter or spread having enhanced roasted peanut flavor and an enhanced saltiness impression containing: a) from about 40% to about 70% peanut solids; b) from about 30% to about 60% peanut oils; c) from about 15% to about 50% non-peanut solids; d) from about 0.01% to about 0.02% citric acid; e) from about 0% to about 40% bulking agent; f) from about 0% to about 5% by weight stabilizer; g) from about 0% to about 3% by weight emulsifier; h) from about 0% to about 8% flavorant.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLAVOR ENHANCEMENT OF REDUCED FAT NUT BUTTERS THROUGH THE ADDITION OF CITRIC ACID

This is a continuation of application Ser. No. 08/361,339, filed on Dec. 21, 1994, now abandoned.

FIELD OF THE INVENTION

The present invention relates to nut butters or nut spreads, preferably to a reduced fat level peanut butter or spread. The invention provides a reduced fat peanut butter or spread having an enhanced peanut flavor and an enhanced saltiness impression.

BACKGROUND OF THE INVENTION

Full fat conventional peanut butters consist of a mixture of solid nut particles, liquid peanut oil, and other optional ingredients including flavorants (e.g., a sweetener such as sugar, molasses, high fructose corn syrup or honey; and salt), an emulsifier and a stabilizer. A peanut paste is generally prepared by roasting and blanching raw peanut kernels and then grinding them. The grinding operation breaks the cellular structure of the peanut kernels, liberating oil in which the comminuted nut particles are suspended to form a peanut paste having a pasty and spreadable consistency. The flavorants, emulsifier, stabilizer and other optional ingredients are then added to the peanut paste to provide a peanut butter having a desirable taste and consistency.

Flavorants are an important, and perhaps necessary, ingredient to the consumers of peanut butter. Peanut butter paste in its pristine form, i.e., without flavorants such as sweeteners and salt, exhibits a bland and generally undesirable taste. Likewise other additives, such as protein in reduced fat peanut butters or spreads satisfies the fundamental need for protein; however, protein additives do not satisfy the desire for a flavorful peanut butter.

It is therefore an object of this invention to provide a reduced fat peanut butter or spread that has an enhanced flavor, especially an improved peanut flavor and saltiness impression, through the addition of a novel peanut butter flavorant, citric acid.

Reduced fat peanut butters or spreads achieve the goal of providing a low fat alternative to consumers who wish to reduce their daily fat intake. The present invention not only provides a reduced fat peanut butter, but provides a reduced fat peanut butter with enhanced peanut flavor that also has a lower amount of added salt. Our health conscious society is continually searching for ways to reduce their salt intake. A diet that is high in salt not only is believed to contribute to high blood pressure, but is also believed to contribute to a variety of other health concerns. Through the addition of a novel peanut butter flavorant, citric acid, the level of salt normally found in peanut butter (1.2% to 1.5%) may be reduced to 0.9% or below.

It is therefore an object of this invention to provide a reduced fat peanut butter or spread having a reduced salt level, through the addition of citric acid. This spread exhibits a desirable saltiness impression at a lower salt level.

It is a further object of the present invention to provide a reduced fat peanut butter or spread, wherein oxidation of peanut oil is retarded. The present invention achieves oxidative stability through the chelation of metal ions by the citric acid. Metal ions catalyze the oxidation of peanut oil contributing to rancidity over time.

The present invention thus provides a reduced fat peanut butter or spread having a) an enhanced flavor, especially the peanut flavor and the saltiness impression; b) a reduced salt content; and c) oxidative stability. These benefits are achieved by the addition of a readily available and low cost additive: citric acid.

SUMMARY OF THE INVENTION

The present invention relates to a reduced fat nut butter or spread having enhanced roasted peanut flavor and an enhanced saltiness impression which contains:

(a) from about 40% to about 70% by weight nut solids;

(b) from about 33% to about 60% by weight nut oils;

(c) from about 15% to about 50% by weight non-fat containing solids;

(d) from about 0.01% to about 0.02% by weight citric acid, alkali or alkaline earth metal salts of citric acid or mixtures thereof;

(e) from about 0% to about 40% by weight bulking agent;

(f) from about 0% to about 5% by weight stabilizer;

(g) from about 0% to about 3% by weight emulsifier;

(h) from about 0% to about 8% by weight flavorant;

DETAILED DESCRIPTION OF THE INVENTION

The present invention relates to a reduced fat nut butter or spread having an enhanced roasted nut flavor and an enhanced saltiness impression, through the addition of citric acid. While this invention will be generally described in terms of peanuts and peanut butter, it should be readily apparent that other materials such as almonds, pecans, walnuts, cashews, filberts, macadamia nuts, Brazilians, sunflower seeds, sesame seeds, pumpkin seeds and soybeans could be utilized in this invention. The term "nut" as used herein encompasses these nuts and oil seeds. Mixtures of these nuts and oil seeds can also be used.

The term "nut butter" as used herein means a spreadable food product made from nut solids and oil, and encompasses spreads and purees. Nut butters according to the prevent invention will contain from about 40% to about 70% nut solids. Reduced fat nut butters of this invention will contain from about 33% to about 45% oil, while regular fat (not reduced fat) nut butters will contain from about 45% to about 60% oil, the remainder being additives, e.g., stabilizers, flavorants, emulsifiers and bulking agents.

Nut butter includes, but is not limited to, the terms "peanut butter" and "peanut spread" as these terms are defined by the standards of identity of the Food and Drug Administration.

The oil used in the composition can be the oil which naturally comes from the nut or seed during the grinding and defatting step. Oils such as soybean oil, palm oil, cottonseed oil, coconut oil, walnut oil and other suitable oils can also be used herein to make the nut butter. Preferably, for peanut butter, peanut oil is used. Up to about 35% peanut oil can be used in the present invention. With other products, such as the sunflower seeds and other nuts, mixtures of oils may be preferred for flavor. During the defatting and grinding process some oil is released from nut solids. This can be incorporated in the paste.

Low calorie oils and zero calorie oils such as sucrose polyesters of long chain fatty acid (olestra) and other polyol polyesters of fatty acids can be used (see for example U.S.

Pat. No. 3,600,186 to Mattson et al. and 4,005,196 to Jandacek). Mixed triglycerides made from medium and long chain saturated and/or unsaturated fatty acids can also be used herein. (See for example U.S. Pat. No. 5,288,512, to Seiden.) An oil which contains at least 10% medium chain triglycerides can also be used. Medium chain triglycerides are saturated fatty acids having from six to twelve carbon atoms. Reduced calorie peanut butters containing medium chain triglycerides are described in U.S. Pat. No. 4,863,753 (Hunter et al., 1989).

In order to lower the fat content and maintain protein levels in the spread, non-fat containing solids are used. As used herein, "nonfat containing solids" refers to solids that are not derived from the nut and which contain less than about 2% fat or oil. These include corn syrup solids, maltodextrin, dextrose, polydextrose, fiber, mono- and disaccharides, starches (e.g., corn, potato, tapioca wheat) and flours (e.g., wheat, rye, pea); protein supplements such as additional peanut solids, soy flour, soy concentrate, soy isolate, casein, egg whites, and protein from other animal or vegetable sources; or a combination of the above as well as bulking agents. The sugars, honey or molasses used to sweeten or flavor the nut spread are included in the level of solids. Typically 3% to 10% sugar or molasses is used for flavoring.

Bulking agents can also be used in the nut butters of the invention at levels up to about 40%. Bulking agents add body or texture to the product and are usually non-nutritive or low calorie materials. Polydextrose (from Pfizer Chemicals) and maltodextrin are preferred bulking agents. Fibers, such as cellulose, can also be added. Sugar substitutes which function like sugars but which are non-nutritive can also be used herein. Such sugar substitutes include the 5-C-hydroxyalkylaldohexoses described in U.S. 5,041,541, issued to Mazur, Aug. 20, 1991. If bulking agents are used, generally from about 5% to 40% bulking agents are added, preferably from about 12% to about 27%.

The non-fat containing solid ingredients typically comprise from about 15% to about 50% of the nut spread. Preferably, the non-fat containing solid ingredients comprise from about 25% to about 45% of the nut spread. More preferably, the non-peanut solid ingredients comprise from about 35% to about 45% of the nut spread. The level of protein solids added depends on the protein level required or desired in the final product.

The nut butters or spreads also contain from about 0.01% to about 0.02% citric acid or its alkali or alkaline earth metal salts. Preferably from about 0.01% to 0.015% citric acid is used. Preferably, citric is used in its acid form or as salts with sodium, potassium, calcium, magnesium or other food approved forms. The citric acid is added as a finely ground solid without the need for a separate solubilizing agent.

The addition of citric acid or its salts, enhances the roasted peanut butter flavor and the saltiness impression, thereby reducing the amount of additional salt required to give peanut butter an acceptable flavor. Citric acid's one hydroxyl and three carboxyl groups allow for a variety of functions in the nut butter or spread. The addition of citric acid or its salts, in the presence of a metallic ion salt, allows the peanut butter to achieve oxidative stability through chelation of the metal ions by the citric acid.

The products of the present invention may also optionally contain from 0% to about 5% stabilizer. Preferably from 1% to about 3% is used. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. No. 3,597,230 and 3,129,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, up to about 3% emulsifier can be used in the nut butters to achieve the proper texture. The emulsifier can be any food compatible emulsifier such as mono- and di-glycerides, lecithin, sucrose monoesters, polyglycerol esters, sorbitan esters, polyethoxylated glycols and mixtures thereof. Up to about 3% and, preferably from 1% to 3% emulsifier is used.

The peanut butters or spreads described herein can also optionally contain up to about 8% flavorants. "Flavorants" as the term is used herein, are agents which contribute to or enhance the flavor of the nut butter or spread. These include sweeteners, natural and artificial flavors, and other additives which contribute to the flavor of the butter or spread. Sweeteners are selected from the group consisting of sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will be something which has a sweetness intensity about that of sucrose or fructose. Sweeteners are added at a level of 0% to about 8%, preferably from about 1% to about 6%.

Artificial sweeteners such as aspartame, acesulfam, saccharine, cyclamate and glycerrhizin can also be used in the present invention. The amount of artificial sweetener used would be that effective to produce the sweetness that is desired; and would be about the equivalent of the addition of from about 1% to 7% of sucrose. Usually from about 0.001% to about 2% artificial sweetener is used.

Flavor enhancers including salt or salt substitutes such as potassium chloride, sodium chloride/potassium chloride mixtures, and seasoned salts and molasses can also be used. In the present invention, the addition of from about 0.01% to about 0.02% citric acid or its salts enhances the saltiness impression, thereby reducing the amount of additional salt required to achieve an acceptable flavor. The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

Nut chunks (including defatted nut chunks), flavored or candied bits and other additives can be mixed with the nut butters of the invention at the desired level. These additives include chocolate chips or bits of other flavored bits, e.g., butterscotch and peanuts, jellies (either low calorie jellies or regular jelly or preserves), and praline nuts or other candies. Proteins, such as sunflower protein or seeds, albumin, whey protein, or soy protein, can be added to fortify this low fat product with protein materials. These additives are usually added at a level of from about 1% to about 20% by weight. Nut chunks and flavored bits can contain fats and oils. Therefore, the addition of these materials can affect the fat content and calorie level of the nut butter or spread.

The process of the present invention utilizes a nut paste, preferably peanut paste, as a starting material. The nut paste can be formed by any of a number of known methods. For example, the nuts can be roasted and then ground in a conventional grinder or mill such as a Bauer mill to produce a nut paste of pumpable consistency. The nut paste may optionally be defatted or the particle size of the nut solids of the nut paste may be reduced. See, for example Wong et al.; U.S. Pat. No. 5,097,027; issued Jan. 7, 1992, herein incorporated by reference.

The nut paste will typically comprise from about 50% to about 90% of the nut spread. Preferably, the nut paste will comprise form about 50% to about 85% of the nut spread. More preferably, the nut paste will comprise from about 55% to about 65% of the nut spread.

The process of the present invention involves as a first step depositing the peanut paste into a mixing tank. Next, the solid ingredients are added to the mixing tank and the mixture of peanut paste and solid ingredients is passed through a high shear mixer. Next, the mixture is pumped through a homogenizer at a pressure ranging from about 9,000 psig to about 14,500 psig and then a colloid mill. The temperature of the mixture is adjusted so that the temperature of the nut paste exiting the homogenizer is less than 240° F. (116° C.). Finally, the mixture is passed through a deaerator (versator) and a scraped wall heat exchanger. Nut spreads prepared according to this process will have a monomodal or bimodal particle distribution such that at least 50% of the solids in the nut spread have a particle size of less than about 18 microns and at least 90% of the solids in the nut spread have a particle size of less than about 60 microns. Nut spreads prepared according to the process of the present invention will further have a Casson plastic viscosity of from about 8 to about 17 poise and a Casson yield value of less than about 300 dynes/cm$^2$.

Each of the basic steps of the process of the present invention is described in detail as follows:

A. Depositing the peanut paste into mixing tank

As a first process step, the peanut paste made from conventional roast and ground nuts is deposited into a mixing tank such as a Hamilton kettle. The peanut paste is mixed as the solid ingredients are added as described in step (B).

B. Mixing the solid ingredients with the paste

In a second process step, the solid ingredients are added to the mixing tank containing the peanut paste while mixing at a low or medium speed. The solid ingredients are typically added gradually over a time period ranging from about 15 to about 45 minutes. It may be desirable to add the corn syrup solids and the sugar and flavorants first, followed by the protein solids, particularly when making a crunchy peanut spread. This keeps the protein from hydrating and/or denaturing and causing a higher viscosity product.

The mixture of peanut paste and solid ingredients is passed through a high shear mixer such as a colloid mill, and typically a heat exchanger, before proceeding with step (C). In a preferred embodiment, as the solid ingredients are gradually added, a portion of the resulting mixture of peanut paste and solid ingredients is simultaneously recycled through a colloid mill and back into the mixing tank. This recycling is generally continued at least until all of the solids have been added. Typically, but not necessarily, the recycling is continued until the Casson plastic viscosity of the mixture of peanut paste and solids is in the range of from about 60 to about 70 poise. In any event, the Casson plastic viscosity of the mixture at this point in the process will exceed 30 poise.

C. Adjusting the temperature of the mixture such that the temperature exiting the homogenizer in step (D) will be less than about 240° F. (116° C.)

The mixing and colloid milling employed in step (B) causes the temperature of the mixture of peanut paste and solids to rise. When the temperature of the mixture exiting the homogenizer (step D) exceeds 240° F. (116° C.), the nut spread will be very viscous due to unfolding, denaturation and oil absorption by the proteins as well as carmelization of the sugars, i.e., sucrose, molasses and corn syrup solids that occurs at these high temperatures. This makes the nut spread extremely difficult to process. However, if the temperature of the mixture as it exits the homogenizer in step (D) below is less than about 240° F. (116° C.), the nut spread exiting the homogenizer will be desirably fluid and easy to process.

By way of example, when the homogenizer is operated at a pressure of 12,000 psig, the temperature of the mixture before it enters the homogenizer should be adjusted to less than about 68.3° C. (155° F.) to ensure that the temperature of the nut spread exiting the homogenizer does not exceed 240° F. (116° C.). Preferably, when the homogenizer is operated at a pressure of 12,000 psig, the temperature of the mixture entering the homogenizer is from about 65.5° C. (150° F.) to about 68.3° C. (155° F.). In general, for every 1000 psig increase in pressure, the temperature of the mixture as it exits the homogenizer increases by about 60° F. (16° C.). The temperature of the mixture can be adjusted to within the desired range by any of a number of conventional methods, e.g., the use of heat exchangers or other cooling mechanism.

D. Pumping the mixture containing the peanut paste and the solid ingredients through a homogenizer at a pressure ranging from about 9.000 to about 14,500 psig.

After the temperature of the mixture has been adjusted as in step (C), the mixture is pumped through a homogenizer, such as a Rannie Model 1351 homogenizer, at a pressure ranging from about 9,000 to about 14,500 psig. Preferably, the pressure in the homogenizer ranges from about 11,000 to about 13,000 psig. Most preferably, the pressure in the homogenizer is about 12,000 psig. The purpose of the homogenizer is to break down the 0 particle size of the solids so that the solids will not impart an undesirable sensation of grittiness to the nut spread upon mastication. The homogenizer also changes the particle size distribution of the spread from polymodal to monomodal or bimodal, which results in a lower viscosity for the final nut spread product.

After homogenization the particle size distribution of the particles is such that at least about 50% of the solids have a particle size of less than about 18 microns, preferably less than 15 microns, more preferably less than 13 microns and at least about 90% of the solids have a particle size of less than about 60 microns, preferably less than about 52 microns, more preferably less than about 40 microns. Nut spreads in which at least 90% of the solids have a particle size of less than 60 microns will have a smooth texture (e.g., they will not be gritty). A cell disruption valve can optionally be used in the homogenizer to achieve a higher particle size breakdown at lower pressures.

A heat exchanger may optionally be used after the homogenizer to cool the mixture before it reaches the colloid mill. Use of a heat exchanger or other cooling means can prevent flavor degradation and help to increase the efficiency of the colloid mill.

E. Pumping the homogenized mixture through a colloid mill

Next, the homogenized mixture is pumped through a colloid mill such as a Greerco Colloid Mill to reduce the viscosity of the mixture. Typically, the colloid mill is operated with a wide open gap at about 3600 rpm.

F. Passing the homogenized, colloid milled mixture through a deaerator and a scraped wall heat exchanger.

Finally, the nut spread is finished by passing the mixture through a deaerator (versator) and a scraped wall heat exchanger to increase the oxidative stability of the nut spread product and to set up the crystalline structure of the nut spread. The scraped wall heat exchanger is typically operated such that the freezer outlet temperature is between 97° F. (36° C.) and 100° F. (38° C.).

Chunks or pieces of full fat nuts may be added to the finished product.

Finished nut spreads prepared according to the process of the present invention will have a Casson plastic viscosity of from about 8 to about 17 poise, preferably from about 8 poise to about 15 poise, more preferably from about 8 poise to about 12 poise. The product will further have a yield value of less than about 300 dynes/cm$^2$, preferably less than about 250 dynes/cm$^2$, more preferably less than about 225 dynes/cm$^2$.

The particle size distribution of the product is monomodal or bi-modal. Preferably at least 50% of the solids in the nut spread have a particle size of less than 18 microns, preferably less than 15 microns, most preferably less than 13 microns and at least 90% of the solids have a particle size of less than 60 microns, preferably less than 52 microns, more preferably less than 40 microns.

The nut spreads prepared according to the process of the present invention will have a total fat content of from about 25% to about 42%. Preferably, the nut spreads prepared according to the process of the present invention will have a total fat content ranging from about 28% to about 38%, more preferably from about 30% to about 36%, and most preferably from about 30% to about 32%. Such nut spreads are fluid and have desirable texture (e.g., not gritty) and flavor.

Full fat nut butters or spreads will have a fat content of from about 40% to about 60% fat.

ANALYTICAL TEST METHODS

A number of parameters used to characterize elements of the present invention are quantified by particular experimental analytical procedures. Each of these procedures is described in detail as follows:

1. Casson Plastic Viscosity and Casson Yield Value and Nut Spread

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A sample of 14.0 grams of nut spread (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the nut spread's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread to start moving. The yield value is measured in dynes/cm$^2$. The relationship between the plastic viscosity and the yield value determine how a nut spread will behave in additional processing.

2. Particle Size Analysis

A Malvern 2600D particle size analyzer with an IBM PSI2 computer was used to analyze the particle size of the samples. A small amount (about 0.01 grams) of its sample was placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 100 mm lens to determine the particle size of the paste. Particle sizes from 0.5 to 188 microns can be measured using a 100 mm lens. A magnetic stirrer is used to insure that the sample is being dispersed during the readings. Each sample is swept 250 times by the laser for each reading. Each sample was read a minimum of three times with a five (5) minute wait between each reading.

Example 1

A reduced fat peanut spread prepared by a 400 lb. batch process is made by mixing the following ingredients.

| ingredients | percent (%) |
|---|---|
| peanuts | 61.0 |
| sugar | 7.2 |
| salt | 0.9 |
| molasses | 0.5 |
| CBC Stabilizer | 1.25 |

-continued

| ingredients | percent (%) |
|---|---|
| Emulsifier (mono and diglycerides of palmitic and stearic acids) | 0.7 |
| soy protein isolate | 5.0 |
| corn syrup solids | 23.42 |
| citric acid | 0.015 |

The peanuts are roasted at 422° F. (217° C.) and blanched and ground in a Bauer Mill to form a peanut paste. Two hundred and forty four pounds of peanut paste is then deposited into a 100 gallon Hamilton kettle. The molasses, stabilizer and emulsifier are added to the mixing tank which is held at a constant temperature of 140° F. (60° C.).

The solid ingredients (145.7 pounds), i.e., the soy protein isolate, corn syrup solids, salt, sugar and citric acid are weighed into a Hobart Mixing bowl. The solids are mixed a low speed for about 15 minutes and then loaded into a K-Tron T-35 Twin Screw feeder positioned over the mixing tank.

The solids are then added to the mixing tank containing the peanut paste at a constant rate over a time period of about 70 minutes (feed rate of 12 lbs/hour). Throughout the time that the solids are being added to the peanut paste in the mixing tank, a portion of the tank mixture is pumped through a Gaulin M-3 Homogenizer at 7,000 psig, into a heat exchanger, and then into a Greerco W-500 H Colloid Mill. At least 50% of the solids in the homogenized, colloids milled product stream have a particle size of less than 12.7 microns and at least 90% of the solids in the product stream have a particle size of less than 54.4 microns. This product stream is deposited into the mixing tank.

When all of the solid ingredients have been added to the mixing tank containing the peanut paste/solids mixture, the mixture has a Casson plastic viscosity of 19.1 poise. This mixture is pumped through the homogenizer, heat exchanger and colloid mill for another 110 minutes. The finished nut spread has a Casson plastic viscosity of about 13.5 poise and a yield value of 197 dynes per $cm^2$. The particle size distribution is near monomodal. At least 50% of the solids in the nut spread have a particles size of less than 9.6 microns and at least 90% of the solids have a particle size of less than 38.6 microns. This nut spread is fluid and has a smooth non-gritty texture and a roasted nut flavor. The fat content of the spread is about 34 %.

What is claimed is:

1. A reduced fat nut butter having an enhanced roasted flavor and an enhanced saltiness impression comprising:

a) from about 40% to about 70% by weight nut solids;

b) from about 33% to about 60% by weight nut oils;

c) from about 15% to about 50% by weight non-fat containing solids;

d) from about 0.01% to about 0.02% by weight citric acid;

e) from about 0% to about 40% by weight bulking agent;

f) from about 0% to about 5% by weight stabilizer;

g) from about 0% to about 3% by weight emulsifier;

h) from about 0% to about 8% by weight flavorant.

2. A nut butter according to claim 1 wherein the citric acid content is about 0.01% to about 0.015%.

3. A nut butter according to claim 2 wherein the fat content of said butter is from about 25% to about 35%.

4. A nut butter according to claim 2 wherein the flavorant is from about 0.2% to about 1.0% sodium chloride.

5. A nut butter according to claim 3 wherein citric acid is added to the butter as a finely ground solid.

6. A nut butter according to claim 5 wherein from about 25% to about 45% non-fat containing solid is a protein supplement selected from the group consisting of soy protein, sunflower seed protein, egg white and peanut protein.

7. A peanut butter having an enhanced roasted peanut flavor and an enhanced saltiness impression, comprising:

a) from about 40% to about 70% by weight nut solids;

b) from about 33% to about 60% by weight nut oils;

c) from about 15% to about 50% by weight non-fat containing solids;

d) from about 0.01% to about 0.02% by weight citric acid;

e) from about 0% to about 40% by weight bulking agent;

f) from about 0% to about 5% by weight stabilizer;

g) from about 0% to about 3% by weight emulsifier;

h) from about 0% to about 8% by weight flavorant.

8. A peanut butter according to claim 7 having a Casson plastic viscosity of from about 8 to about 17 poise and a casson yield value below about 300 dynes per square centimeter.

9. A peanut butter according to claim 7 wherein the citric acid content is about 0.01% to about 0.015%.

10. A peanut butter according to claim 9 wherein the fat content of said butter is from about 25% to about 35%.

11. A peanut butter according to claim 10 wherein the flavorant is from about 0.2% to about 1.0% sodium chloride.

12. A peanut butter according to claim 11 wherein citric acid is added to the butter as a finely ground solid.

13. A peanut butter according to claim 7 wherein from about 25% to about 45% non-fat containing solid is a protein supplement selected from the group consisting of soy protein, sunflower seed protein, egg white and peanut protein.

* * * * *